F. WINKLER.
COUPLING DEVICE.
APPLICATION FILED SEPT. 4, 1914.

1,163,298.

Patented Dec. 7, 1915.

Witnesses
B. M. Ferriter.
W. Wallace Naum Jr.

Inventor
Franz Winkler
By Dowell & Dowell
His Attorneys.

UNITED STATES PATENT OFFICE.

FRANZ WINKLER, OF SCHWEINFURT, GERMANY.

COUPLING DEVICE.

1,163,298.   Specification of Letters Patent.   Patented Dec. 7, 1915.

Application filed September 4, 1914. Serial No. 860,275.

*To all whom it may concern:*

Be it known that I, FRANZ WINKLER, a subject of the King of Bavaria, residing at No. 23 Rossbrunnstrasse, Schweinfurt, Germany, have invented certain new and useful Improvements in Coupling Devices, of which the following is a specification.

The invention relates to coupling devices, comprising a rotatable driving member, a driven member independently rotatable of the former, and pawls pivoted in a common support or bearing and permanently engaged with the driving member. The said pawls are adapted to be swung in engagement with the driven member or automatically disengaged therefrom, as the support of the pawls is rotatable relatively to both members. In such devices the coupling of the driving and driven members is more or less immediately effected, when the former is rotating forward at a higher speed than the latter, while automatic disengagement takes place with the greater relative speed of the driven member.

The object of the invention is an improvement of such coupling devices which permits of the rotation of the driving member independently of the driven member until it attains a desired speed. This is attained by providing means which cause the driving member and the support of the pawls to maintain their relative position and therefore to rotate in unison with one another without engagement with the driven member, and other means adapted to produce at any time the relative rotation of the driving member and the support, required for throwing the pawls in engagement with the driven member. This coupling of the driving and driven members is effected by suitably braking or retarding the rotation of the support of the pawls; the advance of the driving member over the said support thereby produced, causes the pawls to engage the driven member.

In the accompanying drawing which forms a part of this specification two constructional forms of the said coupling device are illustrated, representing the invention and their essential features.

Figure 1:
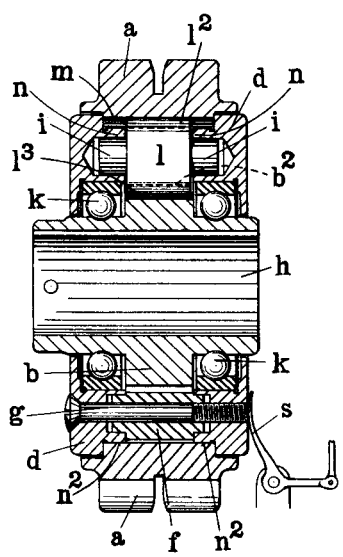
Figure 2:
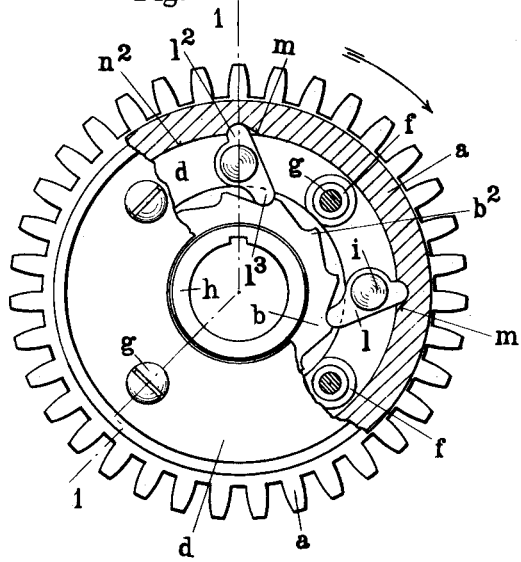
Figure 3:
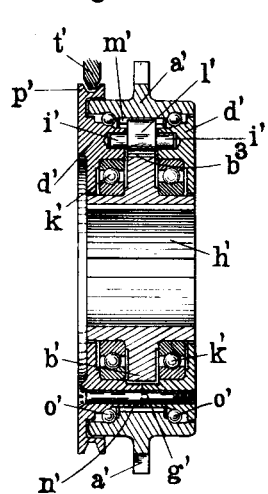

Figure 1 represents a cross section on the broken line 1—1 of Fig. 2; Fig. 2 is a side view and partly a sectional elevation of the coupling device. Fig. 3 is a cross section of the second construction on the line 3—3 of Fig. 4 which is a side and sectional elevation, and Fig. 5 illustrates the coupling applied to an engine.

Like reference characters denote like parts throughout all figures of the drawing.

Referring to Figs. 1 and 2, the coupling consists of a toothed rim $a$ which is guided upon a support or casing comprising two side cheeks $d$, and is mounted on inner annular projections $n$ thereof, so that it is slidable in the circumferential direction. The two side cheeks $d$ of the casing are connected by screws $g$, distance sleeve $f$ being interposed between same. The cheeks $d$ are mounted by means of ball bearings $k$ upon a ratchet or locking wheel or sleeve $h$ which is provided with a projecting ring or flange $b$ formed with locking teeth $b^2$ and located between the side cheeks. The sleeve $h$ is in any known manner non-revolubly secured upon the shaft of the part or machine to be driven, while the toothed rim $a$ is connected with the driving motor by a gearing or chain, a suitable ratio of transmission being thereby obtained, as diagrammatically illustrated in Fig. 5. In suitable bores on the inner sides of the cheeks $d$ are mounted pivots $i$ of pawls $l$, the outer arms $l^2$ of which permanently engage into depressions or recesses $m$ in the inner surface of the toothed rim $a$, while the inner arms $l^3$ may be brought in engagement with the locking teeth $b^2$ of the projecting flange $b$, or disengaged therefrom according to the operation of the device at the time being.

The coupling device acts in the following manner: When the toothed rim $a$ is set in rotation by any driving motor in the direction of the arrow (Fig. 2), while the pawls $l$ are out of engagement with the ratchet flange $b$, the toothed rim $a$ carries during its rotation the pawl-supporting casing with it, owing to the fact that the friction of the sliding surfaces $n^2$ of these two parts is greater than the friction in the ball bearing upon which the said casing together with the toothed rim $a$ revolves. If while the driving motor runs with the desired or full speed, the casing is somewhat braked in its rotation by any suitable means, such as, for instance, by means of a slide spring $s$ which can be pressed at will against the side of a cheek $d$ through the operation of any known controlling means (not shown), as represented in Fig. 1, it somewhat lags behind the toothed rim $a$. Owing to this retardation of the pawl-supporting casing, the toothed rim moves the outer arms $l^2$ of all pawls $l$ in the forward direction, so as to cause the inner arms $l^3$ of the pawls to engage between the locking teeth $b^2$ of the flange $b$. The toothed rim $a$ is then coupled with the sleeve $h$ and also connected with the casing through the pawls, so that all the parts are carried during the rotation. If the sleeve $h$ now receives a higher speed from another drive than that of the toothed rim $a$, the inner arms $l^3$ of the pawls are swung outwardly by the teeth $b^2$ until they are out of engagement with the said teeth of the flange $b$, whereby the coupling is again thrown out. When the pawls are thus disengaged, the parts $a$ and $d$ run in unison upon the balls $k$.

Figure 4:
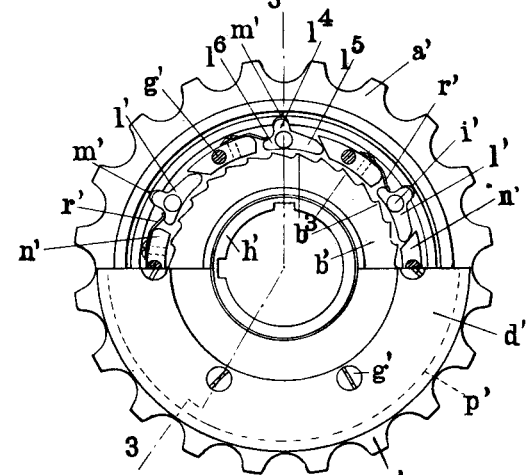
Figure 5:
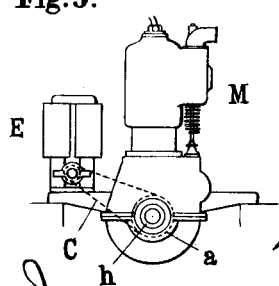

In the construction, represented in Figs. 3 and 4, the toothed rim $a'$ is mounted on the cheeks $d'$ by means of ball bearings $o'$, and in place of the frictional connection between the surfaces $n^2$, preventing relative rotation of the rim $a$ and the casing, as hereinbefore described, springs $r'$ are employed mounted on spacers held fast by the coupling screws $g'$ for the members $d'$ which tend to hold the pawls $l'$ against oscillation. The pawls $l'$ journaled at $i'$ and located in recesses of the annular projections $n'$ are provided with three arms, one of which $l^4$ is permanently engaged in a depression $m'$ of the rim $a'$. Another arm $l^5$ projects opposite to the teeth $b^3$ of the flange $b'$ and is adapted to be thrown in engagement with them. Upon the third arm $l^6$ bears the free end of a spring $r'$ fixed to a projection $n'$ and forcing the said arm in such a direction that the arm $l^5$ is withdrawn from the teeth $b^3$ and normally held out of engagement with them. Upon the left cheek $d'$ a flange $p'$ is formed into the grooved circumference of which a brake block $t'$ can be pressed by a suitable lever or the like. A band brake may be used in lieu of the block. The operation of this construction is similar to that of the device first described. The springs $r'$ hold the pawls $l'$ and thereby the rim $a'$ and the pawl-supporting casing in their relative position, so that when the rim $a'$ is rotated all these parts revolve in unison upon the balls $k'$. When the brake $t'$ is applied the pawl-supporting casing is held back, so that the rim $a'$ throws the pawls $l'$ in engagement with the teeth $b^3$ against the action of the springs $r'$. The rotation of the sleeve $h'$ with a relative higher speed will force the arms $l^5$ outward by means of the teeth $b^3$, whereby all parts will reassume their original position shown in Fig. 4.

This coupling device may be used for different purposes, it is however principally designed for starting combustion engines, and more especially automobile motors. In this application of the coupling device the starting engine, preferably an electromotor E, is connected by a chain C to the toothed rim $a$ of the coupling device the sleeve $h$ of which is attached to the shaft of the benzin motor M. The starting electromotor which may be the magneto of the automobile is fed from a battery and first allowed to reach its full number of revolutions before the coupling is thrown in, as described herebefore. The shaft of the benzin motor M is then set in rotation and as soon as the motor works, the sleeve $h$ together with the motor shaft runs at a greater speed and the coupling is again thrown out, whereupon the magneto may be stopped. In this application of the coupling device a relatively small starting engine can be used, as the inertia of all the rotating parts will assist the power of the electromotor which is thus able to start a large benzin motor.

Two constructional embodiments of the invention have been illustrated and described for the purpose of examples, but it is evident that the invention is not limited to them, as, for instance, the yielding connection between the driving member and the pawl-supporting casing described with a frictional engagement and a yielding connection, may be attained by any other resilient connection directly or indirectly operative between the said parts.

I, therefore, declare that what I broadly claim as my invention, and desire to secure by Letters Patent, is—

1. In a coupling device, the combination with a driving member, of a driven member, pawls adapted to connect or disconnect the said members, a member supporting the pawls and rotatable normally with the driving member, all members being relatively rotatable, a yielding connection between the driving member and the pawl-supporting member, and independent means for operatively connecting the pawls with the driving member.

2. A coupling device comprising a driving member, a driven member, a bearing member located between the said members, all members being relatively rotatable, pawls pivoted in the bearing member, which pawls are permanently engaged with the driving member and adapted to be thrown in engagement with the driven member, a yielding connection between the driving member and the bearing member, and means for throwing said pawls into engagement with the driven member.

3. A coupling device comprising a driving member, a driven member, a bearing member located between the said members, all members being relatively rotatable, pawls pivoted in the bearing member, which pawls are permanently engaged with the driving member and adapted to be thrown in engagement with the driven member, a yielding connection between the driving member and the bearing member, and a braking device for the bearing member.

4. In a coupling device, the combination with a driving member, of a bearing member, said members being adapted to normally rotate in unison, a driven member, all members being capable of relative rotation, pawls engaging said driving member supported in the bearing member and adapted to couple and uncouple the said driving and driven members, and a braking device acting upon the bearing member for causing a relative rotation of the driving and bearing members, and throwing the pawls in gear.

5. In a coupling device, the combination with a driving member adapted to be positively connected to a driving shaft, of a driven member adapted to be attached to a driven shaft, a bearing member normally rotating in unison with the driving member, all members being relatively rotatable, pawls pivotally mounted in the bearing member and engaging said driving member, said pawls being adapted to couple or uncouple the said driving and driven members, and a braking device capable of acting upon the bearing member.

6. A coupling device comprising a driving member, a driven member, a bearing member normally rotating in unison with the driving member, which bearing member supports the driving member and is mounted on the driven member, whereby all members are relatively rotatable, pawls pivoted in the bearing member and engaging said driving member, said pawls being adapted to couple or uncouple the driving and driven members, and a braking device capable of acting upon the bearing member.

7. A coupling device comprising a driving member, a driven member, a bearing member, all members being relatively rotatable, pawls pivotally mounted in the bearing member and engaging said driving member, said pawls being adapted to couple or uncouple the driving and driven members, springs normally holding the pawls in their inoperative position, thereby causing the driving and bearing members to rotate in unison, and a brake capable of acting upon the bearing member, thus producing a retardation of same with respect to the driving member.

8. In a coupling device, the combination with a driving member, of a bearing member, said members being adapted to normally rotate in unison, a driven member, all members being capable of relative rotation, coupling means supported in the bearing member and permanently engaged with the driving member which coupling means are adapted to couple and uncouple the said driving member with the driven member, and a braking device acting upon the bearing member thus causing a relative rotation of the driving and bearing members, which throws the coupling means in engagement with the driven member.

9. A coupling device comprising a driving member, a driven member, a bearing member, means for causing the driving and bearing members to normally rotate in unison, means carried by said bearing member for interlocking said driving and driven members, said interlocking means being normally in engagement with the driving member and out of engagement with the driven member, together with means for causing said interlocking means to engage the driven member whereby the driving and driven members are interlocked, substantially as described.

10. A coupling device comprising a driving member, a driven member, and a clutch member adapted to rotate normally in frictional engagement with the driving member and out of engagement with the driven member, together with independent manually operable means for causing said clutch member to engage the driven member whereby the driving and driven members are interlocked.

In testimony whereof I signed my name to this specification in the presence of two subscribing witnesses.

FRANZ WINKLER.

Witnesses:
W. L. CHANDLER,
JOHN L. ARTRIGHT.